United States Patent [19]

Yu

[11] Patent Number: 5,580,071
[45] Date of Patent: Dec. 3, 1996

[54] SKIING VEHICLE APPARATUS

[76] Inventor: Fu B. Yu, No. 20, Lane 426, Sec. 2, Chong Der Road, Taichung, Taiwan

[21] Appl. No.: 500,103

[22] Filed: Jul. 10, 1995

[51] Int. Cl.⁶ .................................................. B62B 13/12
[52] U.S. Cl. ........................................ 280/21.1; 280/16
[58] Field of Search .................... 280/845, 15, 16 X, 280/17, 18, 21.1, 22, 22.1

[56] References Cited

U.S. PATENT DOCUMENTS

| | | | |
|---|---|---|---|
| 3,862,766 | 1/1975 | Bogdanovich | 280/21.1 |
| 3,900,208 | 8/1975 | Hjelmquist | 280/21.1 |
| 4,063,746 | 12/1977 | Hansen | 280/21.1 |
| 4,114,912 | 9/1978 | Sweeney | 280/21.1 |
| 4,775,161 | 10/1958 | Bridges | 280/16 |

*Primary Examiner*—Richard M. Camby
*Attorney, Agent, or Firm*—Charles E. Baxley, Esq.

[57] ABSTRACT

A skiing vehicle includes a seat having two rear ski boards secured to the rear and bottom portion and having a beam pivotally coupled to the front portion. The beam includes a front ski board secured to the front portion and includes a pair of foot pedals secured to the front portion for rotating the beam. The rear ski boards are moved forward when the beam and the front ski board are rotated by the foot pedals. The beam may include a rod extended in a curved slot of the seat so as to limit a rotational movement of the beam.

5 Claims, 3 Drawing Sheets

SKIING VEHICLE APPARATUS

BACKGROUND OF THE INVENTION

1. Field of the Invention

The present invention relates to a skiing vehicle apparatus, and more particularly to a skiing vehicle apparatus that may be moved by the feet of the users.

2. Description of the Prior Art

Various kinds of skiing apparatus have been developed for use on ice, including ice skate, sled, sledge etc. However, none of the skiing apparatus can be moved forward by the feet of the users.

The present invention has arisen to mitigate and/or obviate the afore-described disadvantages of the conventional skiing apparatus.

SUMMARY OF THE INVENTION

The primary objective of the present invention is to provide a skiing vehicle apparatus which may be moved by the feet of the users.

In accordance with one aspect of the invention, there is provided a skiing vehicle apparatus comprising a seat including a rear and bottom portion and including a front portion, two first ski boards secured to the rear and bottom portion of the seat, a beam including a middle portion pivotally coupled to the front portion of the seat at a pivot axle, and including a front portion having a pair of foot pedals secured thereto for engaging with feet of users; and a second ski board secured to the front portion of the beam. The first ski boards are moved forward when the beam and the second ski board are rotated about the pivot axle by the foot pedals.

The seat includes a curved slot formed in the front portion, the beam includes a rear portion having a rod extended upward therefrom for slidably engaging in the curved slot of the seat so as to limit a rotational movement of the beam.

The foot pedals each includes an engaging means for engaging with the feet of the users.

A handle means is secured on the front portion of the seat and includes a handle having a pair of hand grips secured thereto for controlling the ski vehicle apparatus and includes a post extended downward for securing to the front portion of the seat.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
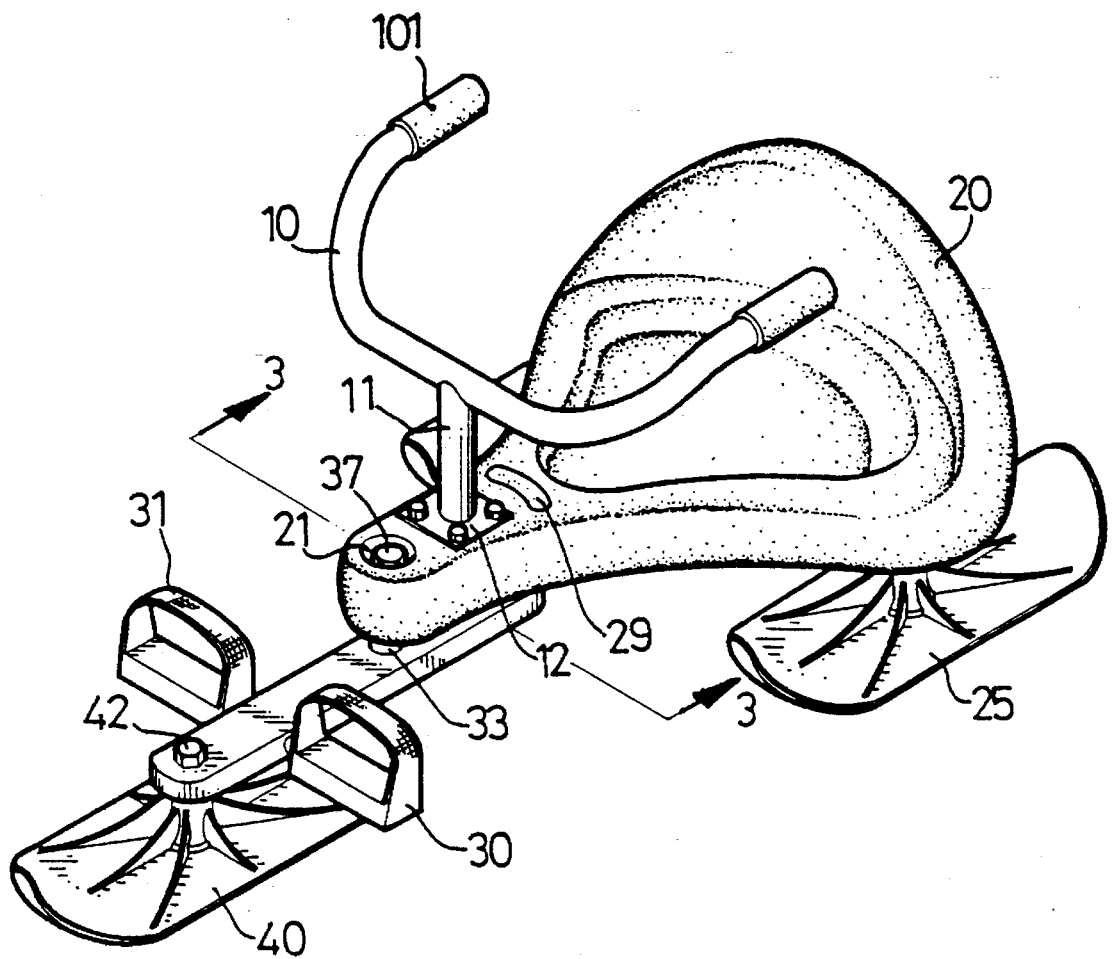
FIG. 1 is a perspective view of a skiing vehicle apparatus in accordance with the present invention.
Figure 2:
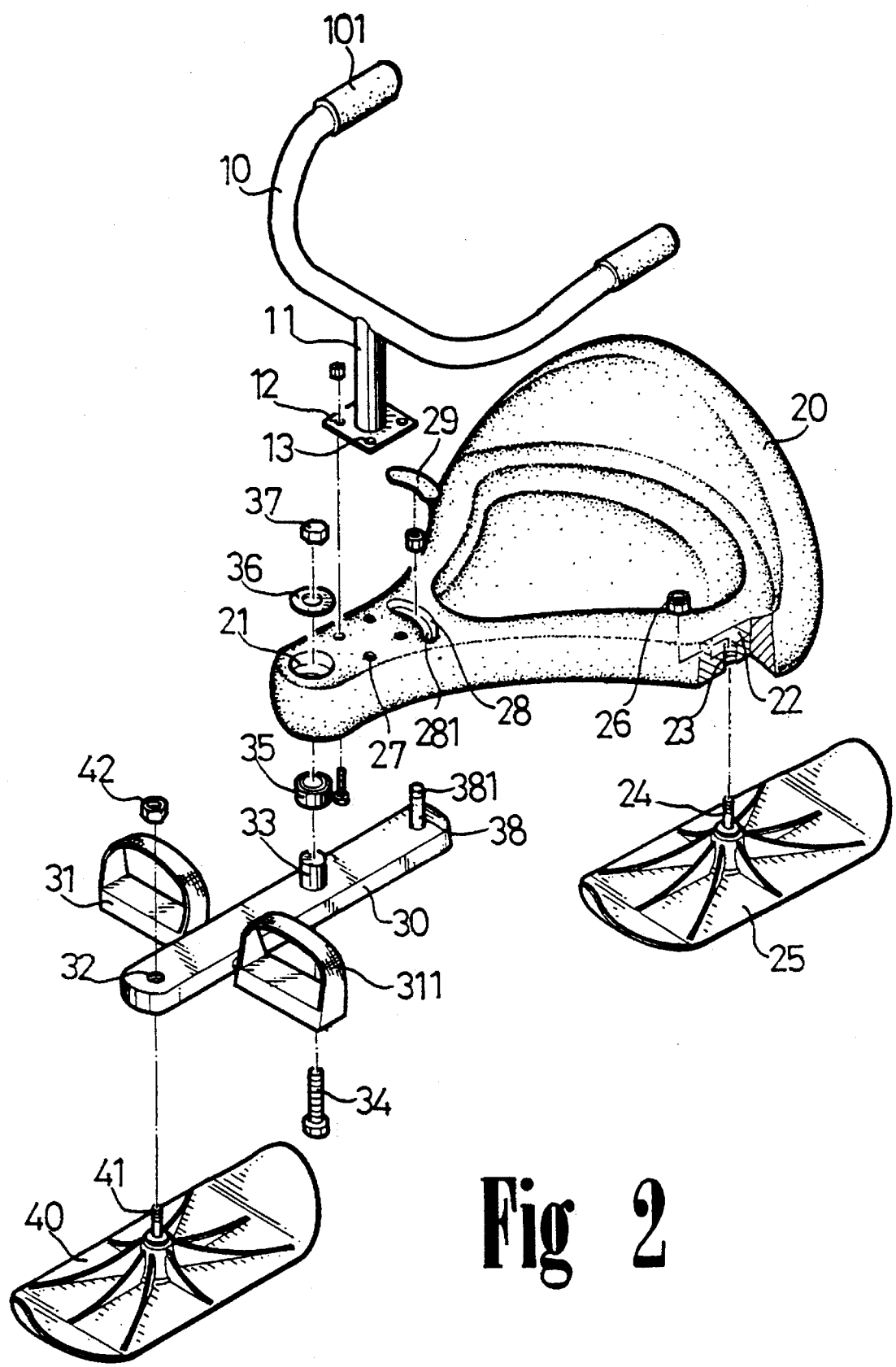
FIG. 2 is an exploded view of the skiing vehicle apparatus.

Referring to the drawings, and initially to FIGS. 1 and 2, a skiing vehicle apparatus in accordance with the present invention comprises a seat 20 including a pair of screw holes 23 formed in the rear portion for engaging with two bolts 24 extended upward from two ski boards 25 such that the ski boards 25 may be solidly secured to the seat 20. The bolts 24 are engaged with nuts 26 which are engaged in the depressions 22 of the seat 20. The seat 20 includes an orifice 21 and four holes 27 formed in the front portion thereof. A handle 10 includes a pair of hand grips 101 provided thereon and includes a post 11 extended downward and having a plate 12 secured to the bottom of the post 11. The plate 12 includes four holes 13 formed therein for aligning with the holes 27 of the seat 20 so as to engage with four screws which may solidly secure the plate 12 and the handle 10 to the seat 10. The seat 20 further includes a curved slot 28 formed in the front portion and having a shoulder 281 formed therein for engaging with a cap 29 which is provided for enclosing the curved slot 28.

Figure 3:
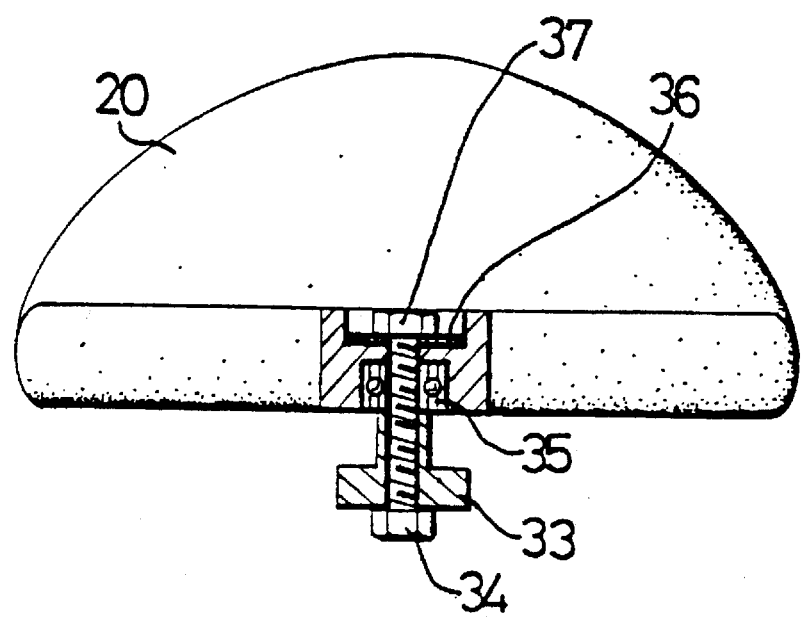
FIG. 3 is a cross sectional view taken along lines 3—3 of FIG. 1.

A bearing 35 is engaged in the orifice 21 of the seat 20 and a washer 36 is engaged on top of the bearing 35. A beam 30 is provided below the front portion of the seat 20 and includes a stud 33 extended upward from the middle portion for engaging with the bearing 35, best shown in FIG. 3. A bolt 34 is engaged through the beam 30 and the stud 33 and the bearing 35 and is engaged with a nut 37 so as to secure the beam 30 to the seat 20 such that the beam 30 is rotatable relative to the seat 20 about the bolt 34. The beam 30 includes a pair of foot pedals 31 provided on the front portion for engaging with the feet of the users. The foot pedals 31 each includes an engaging member 311 provided thereon for solidly retaining the feet of the users to the foot pedals 31. The beam 30 further includes an aperture 32 formed in the front end for engaging with a bolt 41 which is extended upward from another ski board 40 and which is engaged with a nut 42 so as to secure the ski board 40 to the beam 30. The beam 30 includes a rod 38 extended upward from the rear portion for slidably engaging within the curved slot 28 of the seat 20 so as to limit the rotational movement of the beam 30. It is preferable that the rod 38 includes an outer thread 381 formed on the upper portion for engaging with a nut so as to prevent the rod 38 from disengaging from the curved slot 28.

In operation, as shown in FIG. 1, when the users are seated on the seat 20 and depress the foot pedals 30 with their feet, the beam 30 may be caused to rotate about the bolt 34 by applying force against either of the foot pedals 30. When the ski board 40 is rotated about the bolt 34 in one direction, one of the ski boards 25 may be moved forward; and the other ski board 25 may be moved forward when the ski board 40 rotated in a reverse direction, such that the skiing vehicle apparatus may be moved forward when the foot pedals 30 are depressed alternatively.

Accordingly, the skiing vehicle apparatus in accordance with the present invention includes a novel configuration that may be used as a vehicle for moving one ice and that may be moved forward by the feet of the users.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A skiing vehicle apparatus comprising:

a seat including a rear and bottom portion and including a front portion, two first ski boards secured to said rear and bottom portion of said seat, a beam including a middle portion pivotally coupled to said front portion of said seat at a pivot axle, and including a front portion having a pair of foot pedals secured thereto for engaging with feet of users; and a second ski board secured to said front portion of said beam, said first ski boards being moved forward when said beam and said second ski board are rotated about said pivot axle by said foot pedals.

2. A skiing vehicle apparatus according to claim 1, wherein said seat includes a curved slot formed in said front portion, said beam includes a rear portion having a rod extended upward therefrom for slidably engaging in said curved slot of said seat so as to limit a rotational movement of said beam.

3. A skiing vehicle apparatus according to claim 1, wherein said foot pedals each includes an engaging means for engaging with the feet of the users.

4. A skiing vehicle apparatus according to claim 1 further comprising a handle means secured on said front portion of said seat.

5. A skiing vehicle apparatus according to claim 4, wherein said handle means includes a handle having a pair of hand grips secured thereto and includes a post extended downward for securing to said front portion of said seat.

* * * * *